United States Patent Office 3,775,440
Patented Nov. 27, 1973

3,775,440
EPOXIDATION OF TETRAFLUOROETHYLENE AND CHLOROTRIFLUOROETHYLENE
Robert John Cavanaugh and George Milton Atkins, Jr., Wilmington, Del., assignors to E. I. du Pont de Nemours and Company, Wilmington, Del.
No Drawing. Filed May 31, 1972, Ser. No. 258,451
Int. Cl. C07d 1/06
U.S. Cl. 260—348.5 R                     9 Claims

ABSTRACT OF THE DISCLOSURE

A process for the epoxidation of tetrafluoroethylene or chlorotrifluoroethylene which comprises (a) activating a composition consisting essentially of silica by contacting it with oxygen and the tetrafluoroethylene or chlorotrifluoroethylene at from 190 to 300° C., and (b) thereafter contacting the activated composition with the tetrafluoroethylene or chlorotrifluoroethylene respectively, and oxygen at from −10 to 120° C.

---

This invention relates to the epoxidation of tetrafluoroethylene and chlorotrifluoroethylene. In particular, this invention relates to accomplishing the aforesaid epoxidation through the use of silica compositions and oxygen.

The epoxides of tetrafluoroethylene and chlorotrifluoroethylene are known. Both epoxides have been made by the technique involving the heating of a mixture of the fluorinated olefin and oxygen at superatmospheric pressure in an inert fluid diluent. Tetrafluoroethylene epoxide has also been prepared by the direct reaction of tetrafluoroethylene and oxygen, by contacting tetrafluoroethylene and oxygen with a silver catalyst, and by radiation-induced oxidation of tetrafluoroethylene. Additional processes for the preparation of tetrafluoroethylene epoxide include the oxidation of tetrafluoroethylene with potassium permanganate in hydrochloric acid, the use of ozone, and by the fluorination of 1-hydroxy-3-trichloroacetoxy propane. Additional processess for preparation of chlorotrifluoroethylene epoxide include the direct uncatalyzed reaction of chlorotrifluoroethylene and oxygen and the radiation-induced oxidation of chlorotrifluoroethylene. The epoxide of chlorotrifluoroethylene has also been reported to be a product of the pyrolysis of the adducts of chlorotrifluoroethylene and sulfur trioxide. An improved process was sought.

Such a process has been found. It is a process for the epoxidation of fluorocarbon member selected from the class consisting of tetrafluoroethylene and chlorotrifluoroethylene which comprises (a) activating a composition consisting essentially of silica gel by contacting the composition with the fluorocarbon member and oxygen at from 190 to 300° C., preferably at from 240° C. to 300° C., and (b) thereafter contacting the activated composition with the fluorocarbon member and oxygen at from −10 to 120° C., preferably at from 0 to 50° C.

The composition consisting essentially of silica is normally at least 60 percent by weight silica, preferably at least 95 percent by weight silica. "Consisting essentially of" as used throughout the specification and claims does not exclude unspecified materials which do not prevent the advantages of the invention from being realized. Examples of useful compositions are silica gel, soft glass (approximately 72 percent by weight $SiO_2$, 15 percent by weight $Na_2O$, 9 percent by weight CaO, 3 percent by weight MgO, and 1 percent by weight $Al_2O_3$), Pyrex® Brand glass (Corning Glass Works, Corning, N.Y.) (approximately 80 percent by weight $SiO_2$, 14 percent by weight $B_2O_3$, 4 percent by weight $Na_2O$, and 2 percent by weight $Al_2O_3$), quartz glass (approximately 99.9 percent by weight $SiO_2$), Vycor® Brand glass (Corning Glass Works) (approximately 96 percent by weight $SiO_2$, 3 percent by weight $B_2O_3$ and 1 percent by weight other oxides), Pyroceram® Brand ceramic (Corning Glass Works), lithium aluminosilicate glass, macroporous silica beads, Girdler silica carrier T–869 (Chemetron Corp., Girdler Div., Louisville, Ky.) "Cab-O-Sil" fumed silica (M–5) (Cabot Corp., Boston, Mass.) and sand. Normally for better results, the glasses are ground to at least a macropowder (10–30 mesh) before using in the process of this invention. However, this is not required. Silica gel is the preferred composition. Silica gel is normally at least 98 percent by weight silica and preferably has a surface area of at least 80 meter²/gram. Silica gels with surface areas of at least 200 meter²/gram are most preferred.

The composition is normally activated by contacting it with oxygen and the fluorocarbon member at from 190 to 300° C., preferably from 240 to 300° C. Activation is defined as improving the composition's capability of catalyzing the conversion of tetrafluoroethylene or chlorotrifluoroethylene and oxygen to tetrafluoroethylene epoxide or chlorotrifluoroethylene epoxide. The activation temperature and times are dependent on one another and the type of composition utilized. If there is a high temperature, the time to activate the composition is less whereas if the temperature is low, the time required for activation is longer. The time required for activation is normally from 1 to 20 hours. With the preferred activation temperatures, the time required for activation is normally from 2 to 5 hours.

The oxygen utilized in the process of this invention can be in the form of air or other gas mixtures normally containing at least 20 percent by volume oxygen with the remainder being gas which is inert to the reaction such as helium or carbon dioxide. A gas which is substantially all oxygen is preferred. The molar ratio of the fluorocarbon member to the oxygen is normally from 1:2 to 10:1, preferably 1:1 to 5:1.

The process of this invention can be batch or continuous, the latter being preferred. In a continuous operation the tetrafluoroethylene or chlorotrifluoroethylene and oxygen are passed over a bed of the activated composition which can be in a fixed or fluidized form. In the fluidized bed, there is normally continual addition and removal of the activated composition from the bed. Alternatively, activation of the composition is carried out prior to addition to the bed by activating in another vessel.

In the process of the present invention, yields of up to about 70 percent and above can be obtained employing some of the compositions. The conversions normally are about 40 to 90 percent. Conversion as used throughout is defined as the percentage amount of the fluorocarbon member converted to compounds other than the fluorocarbon member specifically, to $COF_2$, $CO_2$, $CF_3COF$, TFEO or chlorotrifluoroethylene epoxide. The percentage yield of fluorocarbon member epoxide is 100 times the moles of fluorocarbon member converted to fluorocarbon member epoxide divided by the moles of fluorocarbon member consumed. The percentage yields of the other compounds are calculated similarly.

The pressure at which the process of this invention is operated depends on the temperature involved. Atmospheric pressure is normally utilized; superatmospheric pressure, normally not above about 3 atmospheres, can be utilized but these higher pressures are generally used when the lower temperatures are being maintained. Some compositions produce low yields and conversions at the lower temperatures, and require higher temperatures or the use of pressure for the preferred yields and conversions. Superatmospheric pressure can be used in both step (a) and step (b), but can be limited to only step (b).

The addition of water in step (b) of the process of this invention sometimes improves the yield of epoxide as opposed to cleavage products particularly at high temperatures (50 to 120° C.). The amount of water added to the reactor is normally from 0.5 to 3 moles percent water, based upon total reactants, i.e., fluorocarbon member and oxygen. Normally, the addition of water is used in step (b) but it can also be used in step (a).

In the process of this invention it is preferred but not required that the temperature change which takes place in the activated composition between step (a) and step (b) be carried out while the composition is in contact with an inert atmosphere such as helium. This tends to reduce the possibility of obtaining points in the activated composition which are "hot," i.e., points where a disproporionate amount of the reaction of step (b) takes place. Better yields and conversions of tetrafluoroethylene and chlorotrifluoroethylene epoxide are obtained if the reaction takes place over substantially the entire activated composition.

It has been found that a polyperoxide is sometimes formed during the epoxidation of tetrafluoroethylene or chlorotrifluoroethylene. This normally begins to appear after about one hour. This polyperoxide is explosive. In runs of extended duration, as the amount of polyperoxide in the composition increases, the activity of the composition gradually decreases. The activity of the composition can be restored and the polyperoxide destroyed by heating the composition to 190 to 300° C. while the composition is in contact with the fluorocarbon member and oxygen, i.e. step (a) of the process of this invention or heating the composition to 180 to 300° C. in an inert atmosphere followed by step (a) of the process of this invention.

Polymers and copolymers of tetrafluoroethylene epoxide are useful as anticorrosion coatings, lubricants, solvents, and films. Chlorotrifluoroethylene epoxide has been reported to be useful as a polymerization catalyst.

The following examples are meant to illustrate, but not to limit the invention. All percentages are molar unless otherwise specified. In the examples TFE is tetrafluoroethylene; TFEO is tetrafluoroethylene epoxide; and PAF is perfluoroacetyl fluoride.

EXAMPLE I

Ninety cc. (approximately 70 g.) of Davison silica gel Grade 01 (Davison Div., W. R. Grace, Baltimore, Md.) (10–20 mesh) were charged to a 6′ long, ⅜″ outside diameter stainless steel coil immersed in a silicone oil bath. The silica gel was intermittently heated at 250° C. for a total of 4½ hrs. under a stream of 20 cc. per minute tetrafluoroethylene and 10 cc. per minute oxygen. The coil was then removed from the oil bath and placed in a water bath at a temperature of 25° C. and the stream of tetrafluoroethylene and oxygen was replaced with a stream of helium. After 15 minutes the helium stream was replaced with a stream of 20 cc. per minute tetrafluoroethylene and 10 cc. per minute oxygen. The temperature of the coil was kept at 26° C. for the remainder of the run. After 30 minutes a sample was taken which showed low conversion of TFE. Twenty-five minutes later another sample was taken. Analysis indicated that there was approximately 100% conversion of the tetrafluoroethylene and the yield of tetrafluoroethylene epoxidation was 47 percent. After an additional 3¼ hours another sample was taken. The conversion of tetrafluoroethylene was 72 percent and the yield of tetrafluoroethylene epoxide was 70 percent. Analysis was accomplished by gas chromatography and infrared spectroscopy.

EXAMPLE II

Ninety cc. (approximately 70 grams) of Davison silica gel Grade 01 (10–20 mesh) was charged to a 6′ long, ⅜″ outside diameter stainless steel coil immersed in a silicone oil bath. The silica gel was heated intermittently at 250° C. for 6¾ hrs. under a stream of 20 cc. tetrafluoroethylene per minute and 10 cc. per minute oxygen. The temperature was then lowered to 50° C. by removing the coil from the oil bath and putting it in a water bath. The stream of tetrafluoroethylene and oxygen was replaced by a helium stream. After 15 minutes the helium stream was replaced with a stream of 20 cc. per minute tetrafluoroethylene and 10 cc. per minute oxygen. After 1½ hours, there was 77 percent conversion of TFE and a trace of TFEO. An analysis of the reactor exit stream 3 hours later indicated that the tetrafluoroethylene conversion was 71 percent and the yield of tetrafluoroethylene epoxide was 55 percent. 1¼ hours later the conversion was 53 percent and the yield was 35 percent. The reactor was then purged with helium at 50 cc. per minute while the silica gel bed was taken through a 6 hour heat cycle with maximum temperature of about 250° C. to remove the polyperoxide residue which had formed during the run. The silica gel was then reactivated by contacting it with 20 cc. per minute tetrafluoroethylene and 10 cc. per minute of oxygen for one hour at 250° C. The temperature of the coil was then dropped to 0° C. by placing the coil in icewater. At the same time the stream of tetrafluoroethylene and oxygen was replaced by helium. Fifteen minutes later the helium stream was replaced with a stream of 20 cc. per minute tetrafluoroethylene and 10 cc. per minute oxygen. After one hour, there was 56 percent TFE conversion and no TFEO. After 1 hour and 40 minutes a sample was taken from the exit stream of the reactor. The conversion was about 100 percent and yield of tetrafluoroethylene epoxide was 31 percent. Analysis was by gas chromatography and infrared spectroscopy.

EXAMPLE III

Following the same general procedure as in Example II, 90 cc. of Davison silica gel Grade 01 which had been previously utilized in the production of tetrafluoroethylene epoxide was heated treated in a helium atmosphere to remove the polyperoxide. This silica gel was contained in a 6′ long, ⅜″ outside diameter stainless steel coil which was immersed in a silicone oil bath. The silica gel bed was contacted with 20 cc. tetrafluoroethylene per minute and 10 cc. oxygen per minute at 250° C. for one hour. The temperature was then lowered in the oil bath over a 30 minute period. The tetrafluoroethylene and oxygen stream was replaced with helium during this period. After the 30 minute period the helium stream was replaced with a stream of 20 cc. per minute tetrafluoroethylene and 10 cc. per minute oxygen, the stream being bubbled through a water bubbler. The exit stream from the reactor was analyzed by gas chromatography and infrared spectroscopy. Table 1 presents yields and conversions at various temperatures.

TABLE 1

| Time after replacing helium with TFE and $O_2$ | Temp., ° C. | Percent conversion TFE | Percent yield | | | |
|---|---|---|---|---|---|---|
| | | | TFEO | PAF | $CO_2$ | COF |
| 1 hour | 105 | 55 | 22 | 24 | 20 | 34 |
| 3½ hours | 110 | 60 | 57 | | 33 | 10 |
| 5 hours | 106 | 57 | 53 | | 38 | 9 |

EXAMPLE IV

A composition was prepared by treating Cab-O-Sil (M–5) fumed silica (Cabot Corporation, Boston, Mass.) with water followed by drying with air at 360° C. Ninety cc. of the silica composition was charged to a 6′ long, ⅜″ outside diameter stainless steel coil immersed in a silicone oil bath. The coil was heated to 250° C. intermittently for 4¾ hours under a stream of 20 cc. per minute tetrafluoroethylene and 10 cc. per minute oxygen. The coil was then removed from the oil bath and placed in a water bath which was at 25° C. At the same time the tetrafluoroethylene and oxygen stream was replaced by a helium stream. After 15 minutes in the water bath, the helium stream was replaced by a stream of 20 cc. per minute tetrafluoroethylene and 10 cc. per minute oxygen. The temperature remained at 25° C. for the rest of the run. Conversions and yields at various temperatures and times are shown in Table 2. At 2¼ hours after the replacement of the helium with tetrafluoroethylene and oxygen, the stream of tetrafluoroethylene and oxygen was bubbled through water via a capillary bubbler prior to its entrance into the coil. Such bubbling was continued throughout the rest of the run. Analysis was by gas chromatography and infrared spectroscopy.

TABLE 2

| Time after replacement of the helium stream with a stream of TFE and $O_2$ | Temp., °C. | Percent conversion TFE | Percent yield | | | |
|---|---|---|---|---|---|---|
| | | | TFEO | PAF | $CO_2$ | COF |
| 1 hour, 40 minutes | 25 | 68 | 14 | 53 | Trace | 32 |
| 3 hrs., 5 minutes | 25 | 5 | 77 | 3 | do | 20 |
| 3 hrs., 50 minutes | 25 | 4 | 63 | 29 | do | 8 |

EXAMPLE V

Ninety cc. (70 grams) of Davison silica gel, Grade 01 (10–20 mesh), could be charged to a 6' long, ⅜" outside diameter stainless steel coil immersed in a silicone oil bath. The coil could be heated to 240° C. for about 3 hours under a stream of 20 cc. per minute chlorotrifluoroethylene and 10 cc. per minute oxygen. The temperature of the coil could be lowered to 25° C. by placing the coil in a water bath. During such lowering of the temperature, the stream of chlorotrifluoroethylene and oxygen would be replaced by helium. After the temperature was lowered, the helium would be replaced by a stream of 20 cc. per minute chlorotrifluoroethylene and 10 cc. per minute oxygen. Analysis of the exit stream from the reactor would reveal that chlorotrifluoroethylene was being converted to the extent of about 17 percent and that the yield of chlorotrifluoroethylene epoxide was about 52 percent. Analysis would be by gas chromatography and infrared spectroscopy.

We claim:

1. A process for the epoxidation of a fluorocarbon member selected from the class consisting of tetrafluoroethylene and chlorotrifluoroethylene which comprises (a) activating a composition consisting essentially of silica by contacting the composition with oxygen and the fluorocarbon member at from 190–300° C., and (b) thereafter contacting the activated composition with the fluorocarbon member and oxygen at from −10 to 120° C.

2. The process of claim 1 in which the fluorocarbon member is tetrafluoroethylene.

3. The process of claim 1 in which step (a) is carried out at from 240–300° C.

4. The process of claim 3 in which the fluorocarbon member is tetrafluoroethylene.

5. The process of claim 4 in which step (b) is carried out at from 0 to 50° C.

6. The process of claim 1 in which step (a) is carried out at from 240° to 300° C. and step (b) is carried out at from 0 to 50° C.

7. The process of claim 6 in which the composition is silica gel.

8. The process of claim 7 in which the fluorocarbon member is tetrafluoroethylene.

9. The process of claim 7 in which the fluorocarbon member is chlorotrifluoroethylene.

References Cited

UNITED STATES PATENTS 3,332,965   7/1967   Fukui et al. _____ 260—348.5 R

FOREIGN PATENTS 1,112,484   5/1968   Great Britain _____ 260—348.5

OTHER REFERENCES

Chemical Abstracts, vol. 70 (1969) 41206k.

NORMA S. MILESTONE, Primary Examiner

U.S. Cl. X.R.

260—348.5 F